United States Patent
Park

(10) Patent No.: US 7,859,612 B2
(45) Date of Patent: Dec. 28, 2010

(54) LIGHT CONCENTRATING SHEET, BACKLIGHT UNIT INCLUDING THE LIGHT CONCENTRATING SHEET AND LIQUID CRYSTAL DISPLAY MODULE INCLUDING THE BACKLIGHT UNIT

(75) Inventor: Jae-Hyun Park, Busan (KR)

(73) Assignee: LG Display Co., Ltd., Seoul (KR)

( * ) Notice: Subject to any disclaimer, the term of this patent is extended or adjusted under 35 U.S.C. 154(b) by 161 days.

(21) Appl. No.: 12/285,925

(22) Filed: Oct. 16, 2008

(65) Prior Publication Data

US 2009/0122225 A1    May 14, 2009

(30) Foreign Application Priority Data

Nov. 13, 2007   (KR) ..................... 10-2007-0115396

(51) Int. Cl.
G02F 1/1335    (2006.01)

(52) U.S. Cl. .................. 349/64; 362/607; 362/620

(58) Field of Classification Search .................. None
See application file for complete search history.

(56) References Cited

U.S. PATENT DOCUMENTS

| 7,440,045 B2 * | 10/2008 | Huang et al. .................. 349/64 |
| 2004/0114065 A1 * | 6/2004 | Yu et al. ....................... 349/61 |
| 2009/0180191 A1 | 7/2009 | Yamada |

FOREIGN PATENT DOCUMENTS

WO    WO 2007/125803 A1    8/2007

* cited by examiner

*Primary Examiner*—Richard H Kim
(74) *Attorney, Agent, or Firm*—Morgan Lewis & Bockius LLP

(57) ABSTRACT

A light concentrating sheet for a liquid crystal display module includes a first base film having flat inner and outer surfaces; a first light concentrating film on the first base film and having a first thermal expansion coefficient; a second light concentrating film on the first light concentrating film and having a second thermal expansion coefficient; and a second base film on the second light concentrating film and having flat inner and outer surfaces.

19 Claims, 6 Drawing Sheets

LIGHT CONCENTRATING SHEET, BACKLIGHT UNIT INCLUDING THE LIGHT CONCENTRATING SHEET AND LIQUID CRYSTAL DISPLAY MODULE INCLUDING THE BACKLIGHT UNIT

The present invention claims the benefit of Korean Patent Application No. 10-2007-0115396 filed in Korea on Nov. 13, 2007, which is hereby incorporated by reference.

BACKGROUND OF THE INVENTION

1. Field of the Invention

The invention relates to a backlight unit and a liquid crystal display module (LCDM), and more particularly, to a light concentrating sheet, a backlight unit and a LCDM where a deformation problem in a configuration is prevented.

2. Discussion of the Related Art

Generally, the cathode ray tube (CRT) has been widely used for TV, measuring machines, information terminals and so on. Unfortunately, the CRT has disadvantages on weight, size and so on. To resolve these problems in the CRT; many kinds of flat panel display devices (FPDs), such as liquid crystal display (LCD) devices, plasma display panels (PDPs), electroluminescence display (ELD) devices, vacuum fluorescent display (VFD) device, and so on, have been introduced.

Among these devices, LCD devices are widely used for notebook computers, monitors, TV, and so on, because they have excellent capabilities of a small size, a thin profile, light weight and low power consumption. Moreover, they can display high quality and color images and have a large displaying area.

The liquid crystal molecules have a definite alignment direction as a result of their thin and long shapes. The alignment direction of the liquid crystal molecules can be controlled by applying an electric field across the liquid crystal molecules. In other words, as the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity. Generally, an additional light source is required because the LCD panel is a non-emissive-type display device. Accordingly, a backlight unit is disposed under the LCD panel. The LCD device displays images using light produced by the backlight unit and supplied to the LCD panel.

The backlight unit may be divided into an edge type and a direct type depending on arrangement of light source: In the direct type backlight unit, at least one light source is positioned under an optical sheet. In the edge type backlight unit, one light source is positioned at a side of the backlight unit. Particularly, the light source is positioned at a side of a light guide plate of the backlight unit. In the edge type backlight unit, light emitted from the light source is projected on a light crystal panel using a light guide plate. The light is changed into a plane light source. The backlight unit includes an optical sheet, such as a diffusion sheet and a prism sheet as a light concentrating sheet, to improve optical properties, for example, brightness uniformity.

FIG. 1 is a cross-sectional view of a portion of a related art backlight unit. Referring to FIG. 1, the light concentrating sheet 10 includes a base film 17 and a prism film 15. The prism film 15 has a convex portion 12 and a concave portion 14. The light guide plate 20 is disposed under the light concentrating sheet 10. The prism film 15 is disposed between the base film 17 and the light guide plate 20. The light from the light source 16 at a side of the light guide plate 20 is guided into the light concentrating sheet 10 by the light guide plate 20.

There are some problems. Because the convex portion 12 of the prism film 15 has a peaked shape, there are damages on the prism film 15 and the light guide plate 20 at a contacting portion 18 of the prism film 15 and the light guide plate 20. For example, brightness uniformity may be degraded by particles generated from frictions between the prism film 15 and the light guide plate 20. Moreover, deformation in the prism film 15 and the light guide plate 20 causes a light loss such that light efficiency is reduced. When the base film 17 is disposed between the prism film 15 and the light guide plate 20, there are also problems. For example, since the concave portion 12 of the prism film 15 contacts a diffusion sheet (not shown), there are problems at a contacting portion between the diffusion sheet (not shown) and the prism film 15.

SUMMARY OF THE INVENTION

Accordingly, embodiments of the invention are directed to a light concentrating sheet, a backlight unit and an LCDM that substantially obviate one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a light concentrating sheet for a liquid crystal display module includes a first base film having flat inner and outer surfaces; a first light concentrating film on the first base film and having a first thermal expansion coefficient; a second light concentrating film on the first light concentrating film and having a second thermal expansion coefficient; and a second base film on the second light concentrating film and having flat inner and outer surfaces.

In another aspect, a backlight unit for a liquid crystal display module includes a lamp on a bottom frame; a light concentrating sheet disposed over the lamp, the light concentrating sheet including: a first base film having flat inner and outer surfaces; a first light concentrating film on the first base film and having a first thermal expansion coefficient; a second light concentrating film on the first base film and having a second thermal expansion coefficient; and a second base film on the second light concentrating film and having flat inner and outer surfaces; and a diffusion sheet on the light concentrating sheet.

In another aspect, a liquid crystal display module includes a liquid crystal panel; a backlight unit for projecting light on the liquid crystal panel, the backlight unit including: a lamp on a bottom frame; a light concentrating sheet disposed over the lamp, the light concentrating sheet including: a first base film having flat inner and outer surfaces; a first light concentrating film on the first base film and having a first thermal expansion coefficient; a second light concentrating film on the first base film and having a second thermal expansion coefficient; and a second base film on the second light concentrating film and having flat inner and outer surfaces; and a diffusion sheet on the light concentrating sheet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF EXEMPLARY EMBODIMENTS

Reference will now be made in detail to exemplary embodiments of the invention, which are illustrated in the accompanying drawings.

Figure 1:
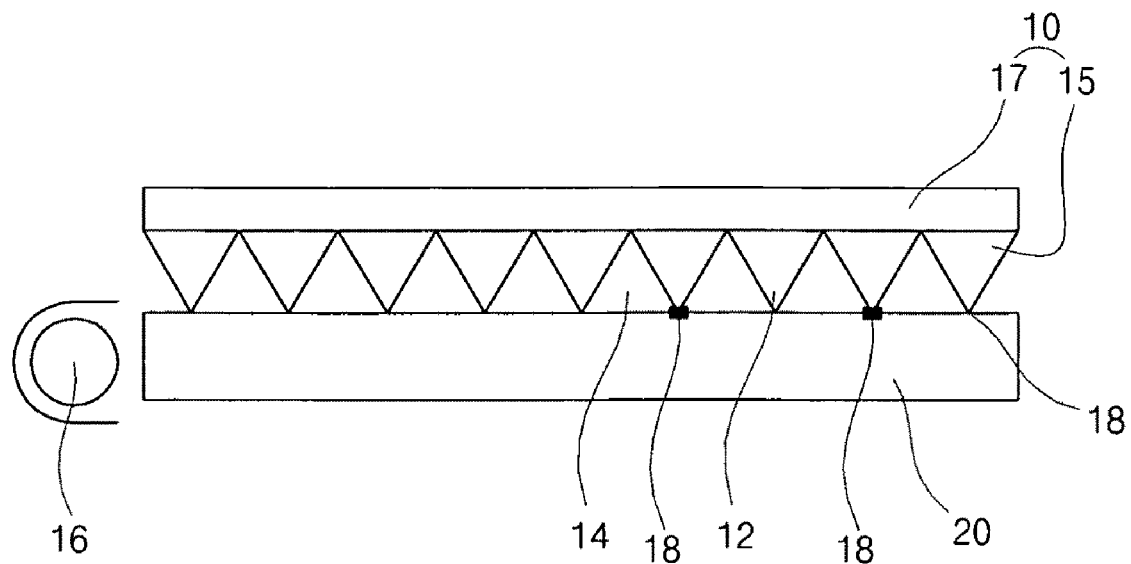
FIG. 1 is a cross-sectional view of a portion of a related art backlight unit.
Figure 2:
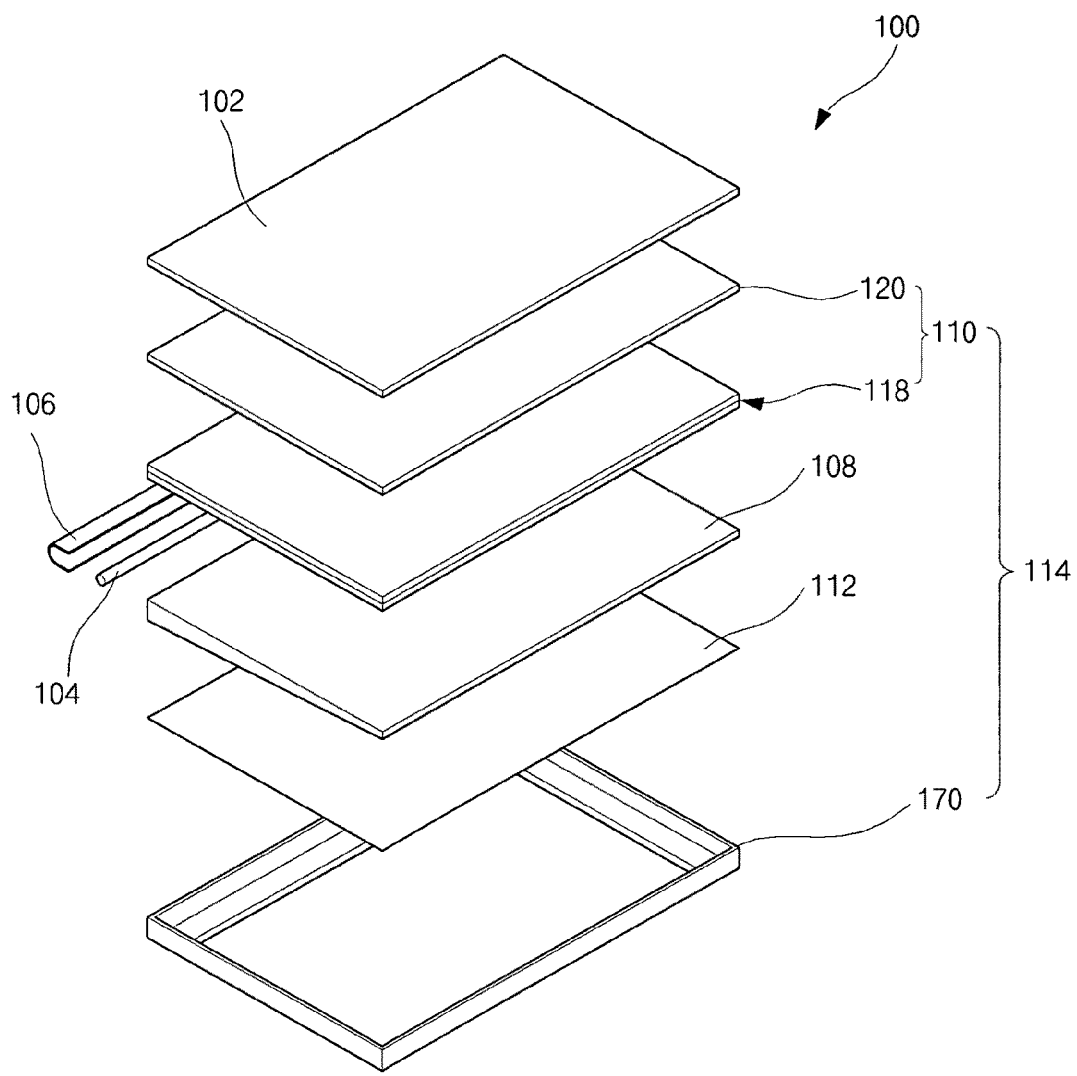
FIG. 2 is an exploded perspective view of a liquid crystal display module (LCDM) according to the present invention.

FIG. 2 is an exploded perspective view of a liquid crystal display module (LCDM) according to the present invention. Referring to FIG. 2, the LCDM 100 includes a liquid crystal panel 102 and a backlight unit 114 disposed under the liquid crystal panel 102. The liquid crystal panel 102 includes first and second substrates (not shown) and facing each other and a liquid crystal layer (not shown) therebetween. Moreover, a gate line (not shown) and a data line (not shown), which cross each other to define a pixel region (not shown), are formed on the first substrate (not shown). The first substrate (not shown) may be referred to as an array substrate. A thin film transistor (TFT) (not shown) is disposed at a crossing portion of the gate and data lines (not shown). A pixel electrode (not shown) in each pixel region (not shown) is connected to the TFT (not shown). A black matrix (not shown) having a lattice shape is formed on the second substrate (not shown). The black matrix (not shown) corresponds to a non-display region, such as the gate line (not shown), the data line (not shown) and the TFT (not shown). A color filter layer (not shown), which includes red, green and blue sub-color filters and corresponds to each pixel region (not shown), is formed on the second substrate (not shown). Moreover, a common electrode (not shown) is formed on the black matrix (not shown) and the color filter layer (not shown). The second substrate (not shown) may be referred to as a color filter substrate.

The liquid crystal panel 102 is connected to a liquid crystal panel driving circuit unit (not shown). The liquid crystal panel driving circuit unit (not shown) provide signals to the gate line (not shown) and the data line (not shown) to drive the liquid crystal panel (not shown). When a common voltage is applied into the common electrode (not shown) and a data signal, which is applied to the pixel electrode (not shown) is controlled, an electric field is induced between the pixel electrode (not shown) and the common electrode (not shown). As a result, as the intensity or direction of the electric field is changed, the alignment of the liquid crystal molecules (not shown) in the liquid crystal layer (not shown) also changes such that light transmissivity is controlled. The LCDM 100 can display images.

The backlight unit 114 includes a lamp 104 as a light source, a lamp housing 106, a light guide plate 108, an optical sheet 110 including a light concentrating sheet 118 and a diffusion sheet 120, a reflective sheet 112 and a bottom frame 170. The lamp housing 106 surrounds the lamp 104. The light guide plate 108 is disposed directly under the liquid crystal panel 102 or the light concentrating sheet 118 and changes light emitted from the lamp 104 into a plane light source. The optical sheet 110 is disposed between the liquid crystal panel 102 and the light guide plate 108. The reflective sheet 112 reflects light from the light guide plate 108 such that the light is projected on the liquid crystal panel 102. The light guide plate 108 includes polymethyl methacrylate (PMMA). The lamp 104 includes one of a cold cathode fluorescent lamp (CCFL), an external electrode fluorescent lamp (EEFL) and a light emitting diode (LED).

The lamp housing 106 surrounds and protects the lamp 104. A light reflecting material is coated inside of the lamp housing 106 such that loss of light from the lamp 104 is minimized. Light from the lamp 104 is incident to the optical sheet 110 through the light guide plate 108. The light is uniformly diffused by the light guide plate 108. A part of the light is incident onto the reflective sheet 112 through the light guide plate 108. However, the light is reflected on the reflective sheet 112 such that the light is projected again the optical sheet 110 through the light guide plate 108. Although the edge type backlight unit is shown in FIG. 2, the LCDM 100 may include the direct type backlight unit where the lamp is disposed directly under the liquid crystal panel or the light concentrating sheet 118 and the light guide plate and the lamp housing are omitted.

Figure 3:
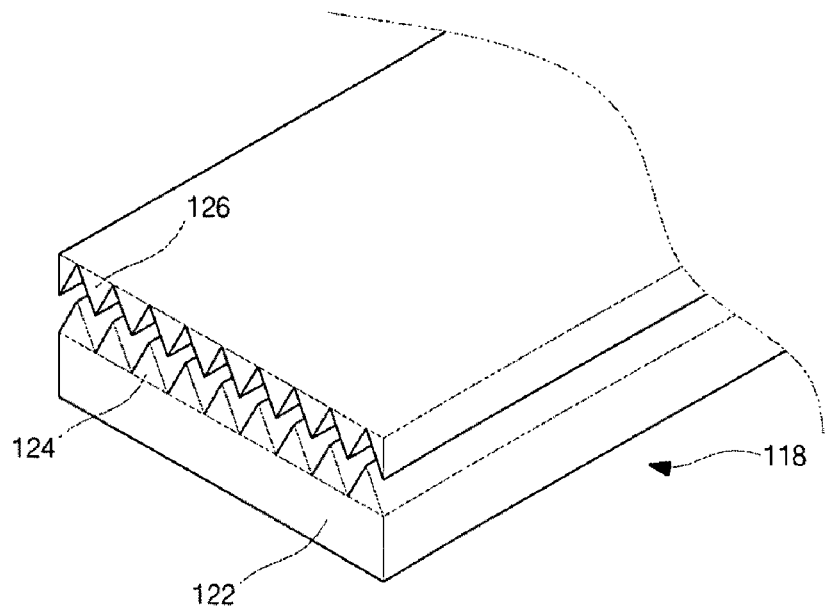
FIG. 3 is a perspective view of a light concentrating sheet according to a first embodiment of the present invention.

FIG. 3 is a perspective view of a light concentrating sheet according to a first embodiment of the present invention. Referring to FIG. 3, the light concentrating sheet 118 includes a base film 122, a first light concentrating film 124 and a second light concentrating film 126. The first light concentrating film 124 is disposed on the base film 122 and has a first refractive index. The second light concentrating film 126 is disposed on the first light concentrating film 124 and has a second refractive index. As mentioned above, the optical sheet 110 (of FIG. 2) disposed on the light guide plate 108 (of FIG. 2) includes the light concentrating sheet 118 and the diffusion sheet 120 (of FIG. 2). The light concentrating sheet 118 concentrates light incident from the light guide plate 108 (of FIG. 2), and the diffusion sheet 120 diffuses light from the light concentrating sheet 118.

Each of the base film 122, the first light concentrating film 124 and the second light concentrating film 126 includes one of polyethylene terephthalate (PET), ultraviolet (UV) curable resin and acrylic resin to from a pattern. Due to UV curable resin or acrylic resin, it is possible to be harden by an ultraviolet (UV) light. The first refractive index of the first light concentrating film 124 is different from the second refractive index of the second light concentrating film 126. For example, the first refractive index is smaller than the second refractive index. Different additives are doped into acrylic resin of the first and second light concentrating films 124 and 126 such that the first refractive index is different from the second refractive index. For example, the first light concentrating film 124 has the first refractive index with a range of about 1.3 to about 1.9, while the second light concentrating film 126 has the second refractive index with a range of about 1.4 to about 2.0.

The base film 122 has a thickness of one of about 100 micrometers, about 125 micrometers, about 188 micrometers and 250 micrometers. A resin is coated on the base film 122. The resin on the base film 122 is patterned using a mold, and then is hardened by the UV light. As a result, the first light concentrating film 124 having a convex portion and a concave portion is formed on the base film 122. Moreover, the concave portion between the convex portions of the first light concentrating film 124 is filled up by a resin. The resin is hardened by the UV light such that the second light concentrating film 126 having a convex portion and a concave portion is formed on the first light concentrating film 124. The base film 122, the first light concentrating film 124 and the second light concentrating film 126 constitute the light concentrating sheet 118.

In the light concentrating sheet 118, a first refraction index of the first light concentrating film 124 is smaller than a second refraction index of the second light concentrating film 126 and greater a refraction index of than that of air. For example, the first refraction index is smaller than about 1.5, and the second refraction index is greater than about 1.5. Light from the light guide plate 108 (of FIG. 2) passes an air layer having a refraction index of about 1. The light from the air layer is sequentially incident on the first light concentrating film 124 and the second light concentrating film 126. Namely, light from the light guide plate 108 (of FIG. 2) passes material layers having gradually increasing refraction indexes to be concentrated. Moreover, due to the convex and concave portions of the first and second light concentrating films 124 and 126, a light path is changed such that light concentrating efficiency is further improved.

Figure 4:
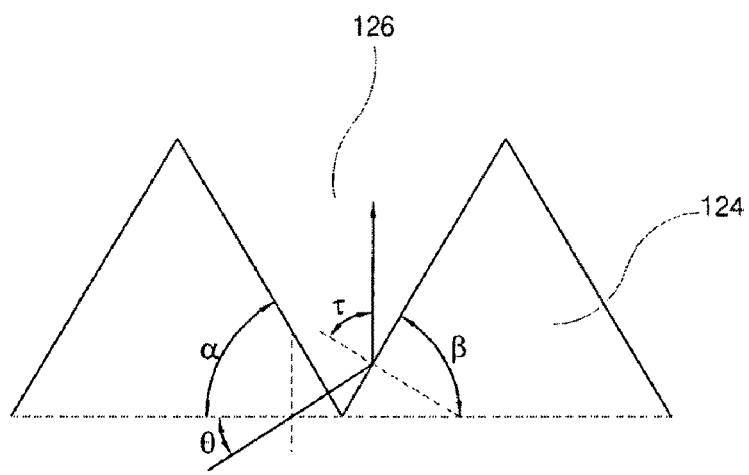
FIG. 4 is a schematic view showing a light path in a light concentrating sheet according to the first embodiment of the present invention.

FIG. 4 is a schematic view showing a light path in a light concentrating sheet according to the first embodiment of the present invention. Referring to FIG. 4, the convex portions of the first and second light concentrating films 124 and 126 has a triangle shape with first and second inner angles of α and β. The light from the light guide plate 108 (of FIG. 2) is incident on the first light concentrating film 124 having the first refraction index with an angle θ through the air layer under the first concentrating film 124. The light from the first light concentrating film 124 is incident on the second light concentrating film 126 having the second refraction index, and then light is outputted from the light concentrating sheet 118 (of FIG. 3) with an angle τ. The angle τ of light outputted from the light concentrating sheet 118 (of FIG. 3) is controlled on basis of an angle of the first and second inner angles α and β of the first and second light concentrating films 124 and 126. In FIG. 4, refraction of the light at an interface of the air layer and the first concentrating film 124 and an interface of the first and second concentrating films 124 and 126.

The concave portion of the first concentrating film 124 corresponds to the convex portion of the second concentrating film 126, and the convex portion of the first concentrating film 124 corresponds to the concave portion of the second concentrating film 126. As a result, the light concentrating sheet 118 including the laminated first and second light concentrating films 124 and 126 has a flat top surface and a flat bottom surface. Accordingly, when the light guide plate 108, the light concentrating sheet 118 and the diffusion sheet 120 are stacked, problems of abrasion, which is generated in the related art LCDM, can be prevented. In addition, since the light concentrating sheet 118 has a flat top surface, other optical sheets can be laminated thereon.

Unfortunately, since the base film 122, the first light concentrating film 124 and the second light concentrating film 126 of the light concentrating sheet 118 have difference in a thermal expansion coefficient, the light concentrating sheet 118 according to the first embodiment of the present invention may have a wrinkle appearance or a curl appearance. When the base film 122 is formed of a material having a thermal expansion coefficient to a material of the first light concentrating film 124, there is a wrinkle appearance or a curl appearance because the second light concentrating film 126 has a thermal expansion coefficient different from the base film 122 and the first light concentrating film 124. When the base film 122 is formed of a material having a thermal expansion coefficient to a material of the second light concentrating film 126, there is also a wrinkle appearance or a curl appearance because the first light concentrating film 124 has a thermal expansion coefficient different from the base film 122 and the second light concentrating film 126. On the other hand, the first and second light concentrating films 124 and 126 may have the same thermal expansion coefficient.

Figure 5A:
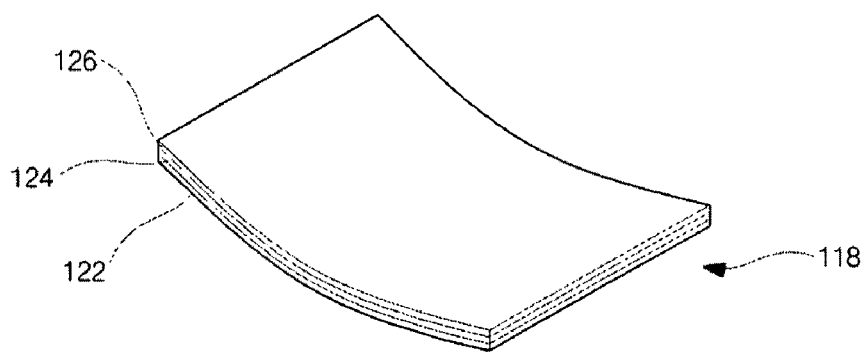
FIGS. 5A and 5B are perspective views showing a cup curl appearance and a cap curl appearance, respectively.
Figure 5B:
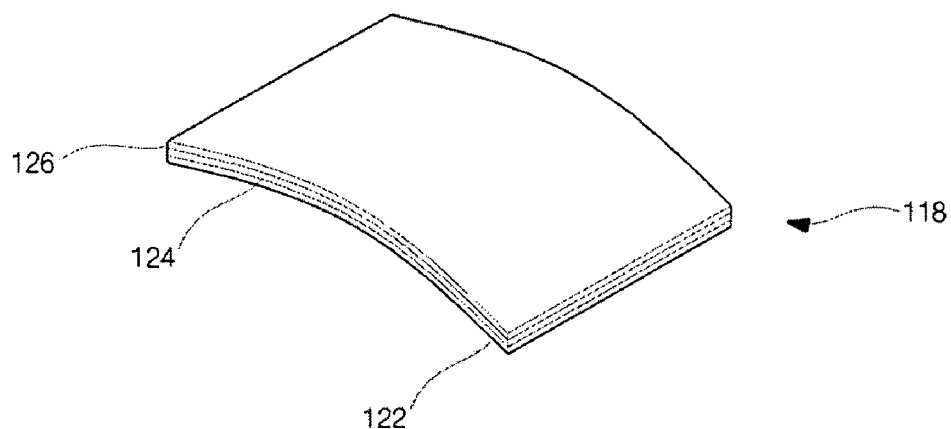

FIGS. 5A and 5B are perspective views showing a cup curl appearance and a cap curl appearance, respectively. When the first light concentrating film 124 has a thermal expansion coefficient greater than the second light concentrating film 126, there is a cup curl appearance as shown in FIG. 5A. On the other hand, when the second light concentrating film 126 has a thermal expansion coefficient greater than the first light concentrating film 124, there is a cap curl appearance as shown in FIG. 5A.

The above deformation in the light concentrating sheet 118 resulted from difference in a thermal expansion coefficient is not restored. The wrinkle appearance causes an exterior deterioration in the liquid crystal panel 102. In addition, the curl appearance causes decrease of brightness and mechanical deformation. Moreover, since the second light concentrating film 126 as a top surface of the light concentrating sheet 118 is exposed, there are damages. For example, when the LCDM is modulated, there are worker's finger marks on the second light concentrating film 126.

Figure 6:
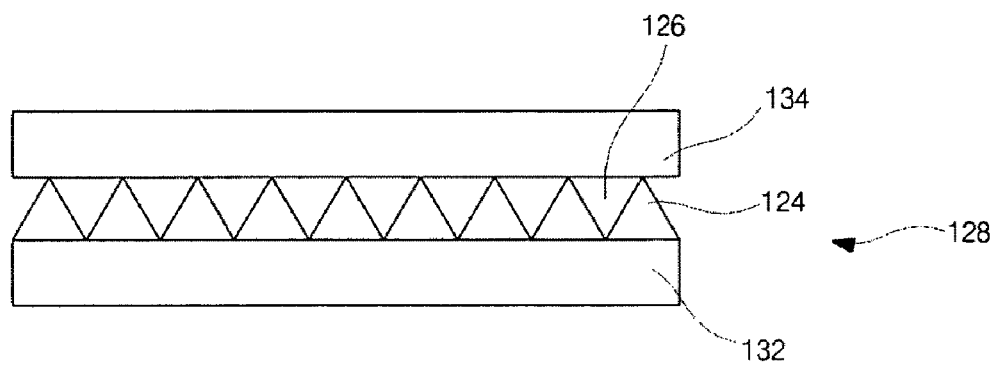
FIG. 6 is a perspective view of a light concentrating sheet according to a second embodiment of the present invention.

FIG. 6 is a perspective view of a light concentrating sheet according to a second embodiment of the present invention. In the light concentrating sheet shown in FIG. 6, two base films are formed on outer sides of first and second light concentrating films, respectively, to resolve a wrinkle appearance and a curl appearance.

In FIG. 6, a light concentrating sheet 128 includes a first base film 132, a first light concentrating film 124, a second light concentrating film 126 and a second base film 134. Each of the first and second base film 132 and 134 has a flat top surface and a flat bottom surface. The first light concentrating film 124 is formed on the first base film 132 and has a convex portion and a concave portion. The second light concentrating film 126 is formed on the first light concentrating film 124 and has a convex portion and a concave portion. The convex portion of the first concentrating film 124 corresponds to the concave portion of the second concentrating film 126, and the concave portion of the first concentrating film 124 corresponds to the convex portion of the second concentrating film 126. Moreover, the second base film 134 is disposed on the second light concentrating film 126. As a result, the light concentrating sheet 118 including the laminated first and second light concentrating films 124 and 126 between the first and second base films 132 and 134 has a flat top surface and a flat bottom surface. The first and second light concentrating films 124 and 126 have difference in a thermal expansion coefficient, and a refracting index of the first light concentrating film 124 is smaller than that of the second light concentrating film 126.

Each of the first and second base films 132 and 134 may be include a synthetic resin, for example, polyethylene terephthalate, polyethylene naphthalate, acrylic resin, polycarbonate, polystyrene, polyolefin, cellulose acetate, or waterproof vinyl chloride. Each of the first and second base films 132 and 134 includes a colorless transparent material for transmission of incident light from the light guide plate 108. Each of the first light concentrating film 124 and the second light concentrating film 126 includes one of polyethylene terephthalate (PET) and acrylic resin to from a pattern.

Figure 12:
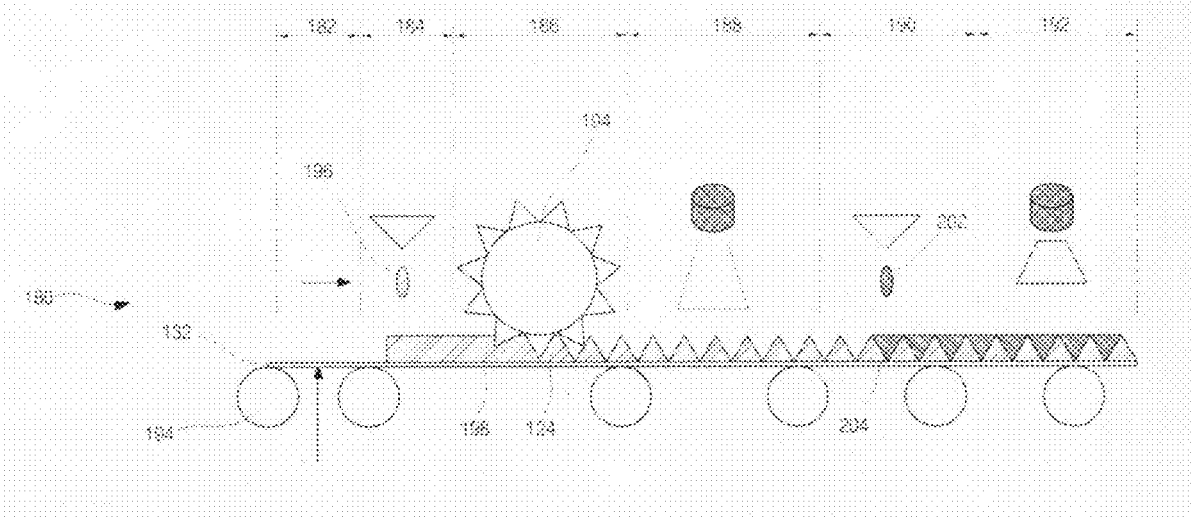
FIG. 12 is a perspective view showing a fabricating process of a light concentrating sheet according to the second embodiment of the present invention.

Referring to FIG. 12 showing a fabricating process of a light concentrating sheet according to the second embodiment of the present invention, a fabricating apparatus 180 for the light concentrating sheet includes a film introducing part 182, a first film coating part 184, a pattern forming part 186, a first hardening part 188, a second film coating part 190 and a second hardening part 192. They are serially coupled with each other.

A first base film 132 is introduced in the film introducing part 182. The first base film 132 is transferred from the film introducing part 182 to the second hardening part 192. After the first base film 132 is transferred into the first film coating part 184, a first layer 198 is formed on the first base film 132 by coating a first resin material 196. After the first base film 132 including the first layer 198 is transferred into the pattern forming part 186, a roller 194 having a convex pattern and a concave pattern contacts the first layer 198 to form a first light concentrating film 124 having a convex portion and a concave portion. Then, the first light concentrating film 124 having the convex and concave portions is hardened by an UV light in the first hardening part 188.

After the first base film 132 including the hardened first light concentrating film 124 is transferred into the second film coating part 190, a second light concentrating film 126 of a second resin material 202 is formed on the first light concentrating film 124. The second light concentrating film 126 is hardened by an UV light in the second hardening part 192. Next, a second base film 134 is laminated on the second light concentrating film 126 such that a light concentrating sheet according to the second embodiment of the present invention is fabricated.

In the light concentrating sheet according to the second embodiment of the present invention, each of the first and second base films 132 and 134 has an average thermal expansion coefficient of the first and second light concentrating films 124 and 126. The average thermal expansion coefficient of the first and second light concentrating films 124 and 126 is calculated by considering a volume of the first and second light concentrating films 124 and 126 and a pitch between the convex and concave portions of the first and second light concentrating films 124 and 126. Namely, difference in a thermal expansion coefficient at an interface of the first base film 132 and the first light concentrating film 124 is substantially the same as difference in a thermal expansion coefficient at an interface of the second base film 134 and the second light concentrating film 126. By these features, the first and second base films 132 and 134 respectively support the first and second light concentrating films 124 and 126 such that a wrinkle appearance and a curl appearance is prevented. Moreover, when the first and second base films 132 and 134 have a thickness greater than the first and second light concentrating films 124 and 126, respectively, a wrinkle appearance and a curl appearance is further prevented.

Figure 10:
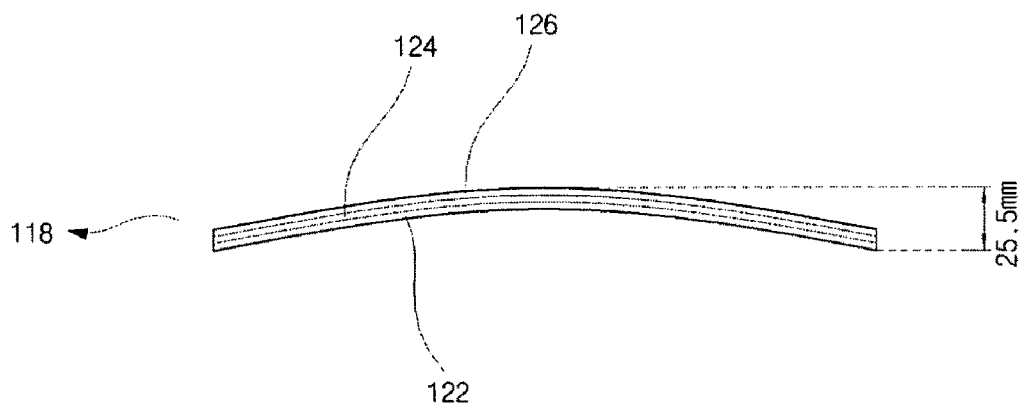
FIG. 10 is a perspective view showing a curl appearance in a light concentrating sheet according to the first embodiment of the present invention.
Figure 11:
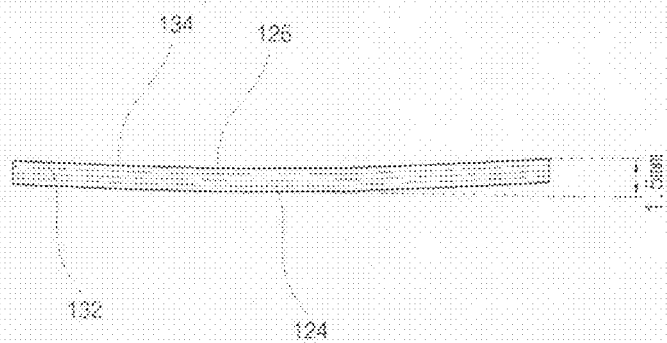
FIG. 11 is a perspective view showing a curl appearance in a light concentrating sheet according to the second embodiment of the present invention.

FIG. 10 is a perspective view showing a curl appearance in a light concentrating sheet according to the first embodiment of the present invention, and FIG. 11 is a perspective view showing a curl appearance in a light concentrating sheet according to the second embodiment of the present invention. The light concentrating sheets according to the first and second embodiments of the present invention is processed under a temperature of about 60 Celsius degrees and a relative humidity of about 90 percentages during about 72 hours. There is a cap curl appearance of about 25.5 mm at both ends of the light concentrating sheet according to the first embodiment of the present invention in FIG. 10, while there is a cup curl appearance of about 1.5 mm at both ends of the light concentrating sheet according to the second embodiment of the present invention in FIG. 11. Namely, a cap or cup curl appearance is prevented in the light concentrating sheet according to the second embodiment of the present invention as compared with the light concentrating sheet according to the first embodiment of the present invention.

In the light concentrating sheet according to the second embodiment of the present invention, the light concentrating sheet includes two base films. Thicker light concentrating sheet causes thicker LCDM. These problems are resolved by third and fourth embodiments of the present invention in FIGS. 7 and 8.

Figure 7:
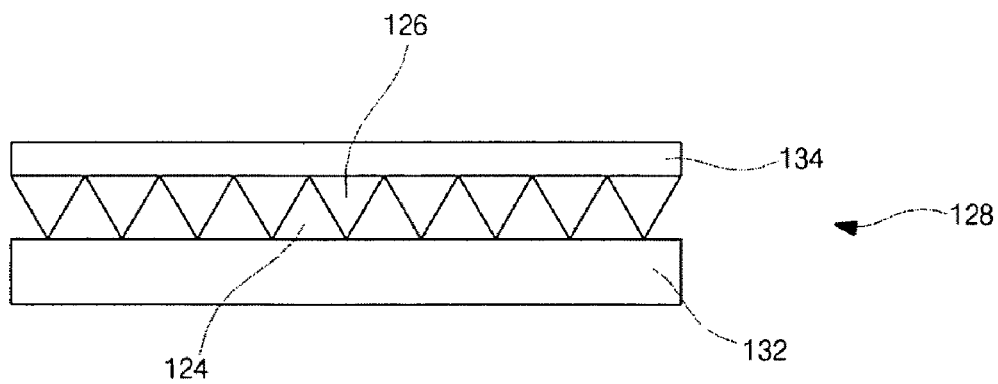
FIG. 7 is a perspective view of a light concentrating sheet according to a third embodiment of the present invention.

In FIG. 7, a light concentrating sheet 128 includes a first base film 132, a first light concentrating film 124, a second light concentrating film 126 and a second base film 134. Different from the light concentrating sheet 128 in FIG. 6, the second base film 134 is thinner than the first base film 132. When the second base film 134 has a thermal expansion coefficient greater than the first base film 132, there is a cap curl appearance. However, due to the second base film 134 thinner than the first base film 132, a cap curl appearance is prevented.

Figure 8:
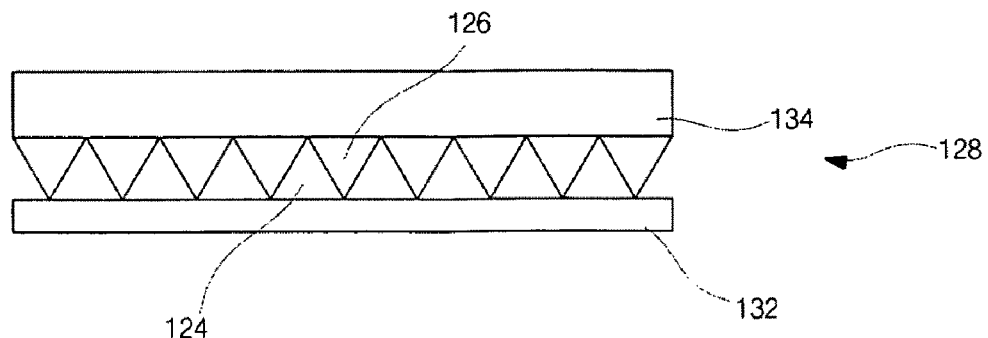
FIG. 8 is a perspective view of a light concentrating sheet according to a fourth embodiment of the present invention.

In FIG. 8, a light concentrating sheet 128 includes a first base film 132, a first light concentrating film 124, a second light concentrating film 126 and a second base film 134. Different from the light concentrating sheet 128 in FIG. 7, the second base film 134 is thicker than the first base film 132. When the first base film 132 has a thermal expansion coefficient greater than the second base film 134, there is a cup curl appearance. However, due to the second base film 134 thicker than the first base film 132, a cup curl appearance is prevented.

Figure 9:
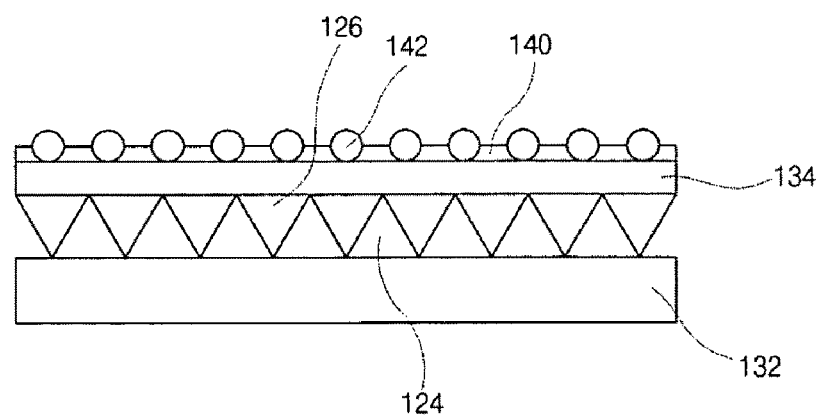
FIG. 9 is a perspective view of a light concentrating sheet according to a fifth embodiment of the present invention.

FIG. 9 is a perspective view of a light concentrating sheet according to a fifth embodiment of the present invention. If the cup or curl appearance still generates, a light concentrating sheet in FIG. 9 is introduced to resolve the problem.

In FIG. 9, a binder material layer 140 including beads 142 is formed on an outer surface of a second base film 134. On the other hand, the binder material layer may 140 include an UV curable resin. Moreover, the binder material layer 140 may be formed not only the outer surface of the second base film 134 but also an outer surface of a first base film 132. Accordingly, a light concentrating sheet includes a first base film 132, a first light concentrating film 124 on the first base film 132, a second light concentrating film 126 on the first light concentrating film 124, the second base film 134 on the second light concentrating film 126 and the binder material layer 140. The beads 142 are attached onto the second base film 134 by the binder material layer 140. On the other hand, the binder material layer 140 may be formed on an outer surface of the second base film 132. Namely, the binder material layer 140 is formed on one of the first and second base films 132 and 134. When one of the first and second base films 132 and 134 has a thermal expansion coefficient greater than the other one of the first and second base films 132 and 134 and there is still a curl appearance with different thickness in the first and second base films 132 and 134, a problem of the curl appearance can be overcome due to a binding between the beads 140. The beads 142 prevent a bad effect of particles for light from the light concentrating sheet. Namely, the beads 142 may cover up the particles. In addition, the beads 142 make the light from the light concentrating sheet being tender in appearance.

The binder material layer 140 includes at least one of acrylic resin, polyurethane, polyester, fluorine-base resin, silicon-base resin, polyimide and epoxy resin. The binder material layer 140 includes a colorless transparent material for transmission of incident light to the first base film 132 or from the second base film 134. The beads 142 has a spherical shape and includes at least one of acrylic resin, polyurethane, polyvinyl chloride, polystyrene, polyacrylonitrile and polyamide. The beads 142 also include a colorless transparent material for transmission of incident light to the first base film 132 or from the second base film 134.

It will be apparent to those skilled in the art that various modifications and variations can be made in the exemplary embodiments of the light concentrating sheet, the backlight unit and the LCDM without departing from the spirit or scope of the invention. Thus, it is intended that the invention cover the modifications and variations of this invention provided they come within the scope of the appended claims and their equivalents.

What is claimed is:

1. A light concentrating sheet for a liquid crystal display module, comprising:
    a first base film having flat inner and outer surfaces;
    a first light concentrating film on the first base film and having a first thermal expansion coefficient;
    a second light concentrating film on the first light concentrating film and having a second thermal expansion coefficient; and
    a second base film on the second light concentrating film and having flat inner and outer surfaces,
    wherein each of the first and second base films includes a material having a third thermal expansion coefficient of an average of the first and second thermal expansion coefficients, and wherein the second thermal expansion coefficient is different from the first thermal expansion coefficient.

2. The light concentrating sheet according to claim 1, wherein each of the first and second light concentrating films includes a convex portion and a concave portion, and wherein the concave portion of the first concentrating film corresponds to the convex portion of the second concentrating film, and the convex portion of the first concentrating film corresponds to the concave portion of the second concentrating film.

3. The light concentrating sheet according to claim 1, wherein the first base film has substantially the same thickness as the second base film.

4. The light concentrating sheet according to claim 1, further comprising a binder material layer including beads and formed on the outer surface of at least one of the first and second base films, wherein one of the first and second base films has a thickness greater and a thermal expansion coefficient smaller than the other one of the first and second base films.

5. The light concentrating sheet according to claim 1, wherein a refraction index of the first light concentrating film is smaller than a refraction index of the second light concentrating film and greater than a refraction index of air.

6. A backlight unit for a liquid crystal display module, comprising:
    a lamp on a bottom frame;
    a light concentrating sheet disposed over the lamp, the light concentrating sheet including:
        a first base film having flat inner and outer surfaces;
        a first light concentrating film on the first base film and having a first thermal expansion coefficient;
        a second light concentrating film on the first base film and having a second thermal expansion coefficient; and
        a second base film on the second light concentrating film and having flat inner and outer surfaces; and
    a diffusion sheet on the light concentrating sheet,
    wherein each of the first and second base films includes a material having a third thermal expansion coefficient of an average of the first and second thermal expansion coefficients, and wherein the second thermal expansion coefficient is different from the first thermal expansion coefficient.

7. The backlight unit according to claim 6, wherein the lamp is disposed directly under the light concentrating sheet.

8. The backlight unit according to claim 6, further comprising a light guide plate disposed directly under the light concentrating sheet, wherein the lamp is disposed at a side of the light guide plate.

9. The backlight unit according to claim 6, wherein each of the first and second light concentrating films includes a convex portion and a concave portion, and wherein the concave portion of the first concentrating film corresponds to the convex portion of the second concentrating film, and the convex portion of the first concentrating film corresponds to the concave portion of the second concentrating film.

10. The backlight unit according to claim 6, wherein the first base film has substantially the same thickness as the second base film.

11. The backlight unit according to claim 6, wherein one of the first and second base films has a thickness greater and a thermal expansion coefficient smaller than the other one of the first and second base films.

12. The backlight unit according to claim 6, wherein a refraction index of the first light concentrating film is smaller than a refraction index of the second light concentrating film and greater than a refraction index of air.

13. A liquid crystal display module, comprising:
    a liquid crystal panel;
    a backlight unit for projecting light on the liquid crystal panel, the backlight unit including:
        a lamp on a bottom frame;
        a light concentrating sheet disposed over the lamp, the light concentrating sheet including:
            a first base film having flat inner and outer surfaces;
            a first light concentrating film on the first base film and having a first thermal expansion coefficient;
            a second light concentrating film on the first base film and having a second thermal expansion coefficient; and
            a second base film on the second light concentrating film and having flat inner and outer surfaces; and
        a diffusion sheet on the light concentrating sheet,
    wherein each of the first and second base films includes a material having a third thermal expansion coefficient of an average of the first and second thermal expansion coefficients, and wherein the second thermal expansion coefficient is different from the first thermal expansion coefficient.

14. The liquid crystal display module according to claim 13, wherein the lamp is disposed directly under the light concentrating sheet.

15. The liquid crystal display module according to claim 13, further comprising a light guide plate disposed directly under the light concentrating sheet, wherein the lamp is disposed at a side of the light guide plate.

16. The liquid crystal display module according to claim 13, wherein each of the first and second light concentrating films includes a convex portion and a concave portion, and wherein the concave portion of the first concentrating film corresponds to the convex portion of the second concentrating film, and the convex portion of the first concentrating film corresponds to the concave portion of the second concentrating film.

17. The liquid crystal display module according to claim 13, wherein the first base film has substantially the same thickness as the second base film.

18. The liquid crystal display module according to claim 13, wherein one of the first and second base films has a thickness greater and a thermal expansion coefficient smaller than the other one of the first and second base films.

19. The liquid crystal display module according to claim 13, wherein a refraction index of the first light concentrating film is smaller than a refraction index of the second light concentrating film and greater than a refraction index of air.

* * * * *